(12) United States Patent
Gnad et al.

(10) Patent No.: US 6,190,296 B1
(45) Date of Patent: *Feb. 20, 2001

(54) APPARATUS FOR MACHINING A MATERIAL WEB

(75) Inventors: Gerhard Gnad, Keltern; Stefan Rau, Karlsbad; Ulrich Vogler, Karlsruhe, all of (DE)

(73) Assignee: Ultraschalltechnik GmbH & Co. KG, Karlsbad-Ittersbach (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/204,823

(22) Filed: Dec. 3, 1998

(30) Foreign Application Priority Data

Dec. 4, 1997 (DE) .................................. 197 53 740

(51) Int. Cl.[7] ........................................ B31B 49/00
(52) U.S. Cl. ..................... 493/8; 493/207; 493/209; 53/75; 53/DIG. 2; 156/73.4; 156/580.2; 100/50
(58) Field of Search ..................... 493/207, 209; 53/75, DIG. 2; 156/73.4, 73.1, 580.1, 580.2; 100/50

(56) References Cited

U.S. PATENT DOCUMENTS

| | | |
|---|---|---|
| 3,534,442 | 10/1970 | Mahle . |
| 4,048,004 | 9/1977 | Waltkins . |
| 4,758,293 * | 7/1988 | Samida ............................. 156/580.1 |
| 4,854,494 | 8/1989 | Von Raben . |
| 5,197,371 * | 3/1993 | Van Der Heijden et al. .... 156/580.1 |
| 5,379,688 * | 1/1995 | Ishii ..................................... 100/50 |
| 5,622,026 * | 4/1997 | Pozzini et al. ......................... 53/75 |
| 5,673,615 * | 10/1997 | Kawakami ............................ 100/50 |

FOREIGN PATENT DOCUMENTS

| | | |
|---|---|---|
| 34 10 954 A1 | 3/1984 | (DE) . |
| 195 26 354 C1 | 7/1995 | (DE) . |
| 44 39 284 A1 | 4/1996 | (DE) . |

* cited by examiner

Primary Examiner—Peter Vo
Assistant Examiner—Hemant M. Desai
(74) Attorney, Agent, or Firm—Birch, Stewart, Kolasch & Birch, LLP

(57) ABSTRACT

In an apparatus for machining a material web by means of a sonotrode, the pressure force of the sonotrode is determined and is used as a control signal for the advance of the sonotrode, as a result of which the nip height is set.

6 Claims, 1 Drawing Sheet

APPARATUS FOR MACHINING A MATERIAL WEB

BACKGROUND OF THE INVENTION

The invention relates to an apparatus for machining a material web with an ultrasonic unit having a sonotrode and with a counterstay tool, the material web being led through a nip between the sonotrode and the counterstay tool and being machined by the sonotrode, the sonotrode being clamped in a slide and the slide being adjustable in relation to the counterstay tool via an adjusting device, with a sensor connected to a control or regulating device which brings about a change in the clearance between the slide and the counterstay tool, as a function of the signal from the sensor.

In addition to rotary punching and cutting rollers, by means of which endless material webs are machined, ultrasonic sonotrodes are increasingly being used, by means of which the material web is connected, cut, perforated, punched, embossed, heat-treated or similarly machined. A critical factor, with regard to both conventional punching and cutting rollers and sonotrodes, is that the nip between the tip of the machining tool and the counterstay tool, which may be a rotating roller or a plane surface, should have a constant height. The material web to be machined, which may also consist of a plurality of layers, is led through this nip. Due to the heat which is generated during machining, the length of the machining tool, for example the sonotrode, changes, and this may lead to a change in the nip height. As a rule, however, a nip which is too narrow leads to a deterioration in the machining of the material and, under certain circumstances, may result in damage to the material web or the tools. Too wide a nip give s an unacceptable sealing quality or cutting quality. The aim, therefore, is to keep the nip as constant as possible.

In an apparatus for the continuous ultrasonic machining of a material web, which became known from DE 44 39 284 A1, the welding nip can be adjusted via an adjusting device. It is proposed to design the adjusting device as a piezoelectric actuator. By means of piezoelectric actuators of this type, the cutting nip may, indeed, be set at a very exact height, but it is scarcely possible for large changes in the nip to be made.

An apparatus for the ultrasonic machining of a material by means of a sorotrode is known from DE 195 26 354 C1. This apparatus has a sensor, by means of which the distance between the sonotrode and the counterstay tool can be measured. The nip clearance is thereby set via the signal from the sonotrode.

The object on which the invention is based is to develop an apparatus of the type initially mentioned, in such a way that, by means of said apparatus, an essentially constant nip for machining the material web is maintained, the apparatus being set relatively quickly to changing material and/or machining parameters.

SUMMARY OF THE INVENTION

In an apparatus of the type initially mentioned, this object is achieved, according to the invention, in that the sensor is a force sensor and a force acting on the sonotrode in the direction of the counterstay tool can be measured via the sensor.

The apparatus according to the invention has the essential advantage that the pressure force of the sonotrode can be determined directly or indirectly via a force measurement, and that, if this force changes, the sonotrode can be displaced in the direction of the counterstay tool or away from the latter. The optimum pressure force is determined by means of tests and the associated measurement value of the sensor is stored as an actual value in the control or regulating device. If, then, the force detected by the sensor changes while the apparatus is in operation, the measurement value of the sensor changes, this value being used as a control variable for the control or regulating device. As a function of this changed measurement value, the position of the sonotrode is changed in such a way that it once again rests on the material web with the same pressure force. Simple, inexpensive and, above all, rapid readjustment is possible in this way.

In a development of the invention, a toggle lever system is provided, via which a pressure force can act on the sonotrode in the direction of the counterstay tool. The sonotrode can be relatively simply advanced in the direction of the counterstay tool or moved away from the latter via this toggle lever system. Moreover, relatively high forces can be generated, whilst at the same time the actuating force can be relatively low. Furthermore, the pressure force can be metered very finely via the toggle lever system. Since the toggle lever is very rigid in the extended or virtually extended state, the return forces acting on the sonotrode when material thickenings occur are very high, so that the nip between the sonotrode and the counterstay tool can be kept constant.

Advantageously, the sensor is provided in or on the toggle lever system or in or on a toggle lever arm. By a change in the position of the toggle joint of the toggle lever system, the forces within the toggle lever system, in particular within the toggle lever arm, are changed, and this can be detected by means of the sensor. Moreover, the forces within the toggle lever system change when the height of the machining nip changes or when the parameters of the material to be machined change.

Preferably, the sensor is arranged in or on the toggle lever arm facing away from the sonotrode. This affords the advantage that the vibrations of the sonotrode are damped virtually completely via the toggle lever system and the sensor is influenced only minimally by these vibrations.

There is provision, in embodiments, for the sensor to be a wire strain gauge, a piezoelectric element or a load cell. In particular, designing the sensor as a wire strain gauge has the essential advantage that, on the one hand, the weight of the sensor is negligible and, on the other hand, the forces occurring in the toggle lever system, in particular on the toggle lever arm, can be measured with great accuracy and without any time delay and the measurement quantity can be used directly, or, if appropriate, with an amplifier being interposed, as an actuating variable in the control or regulating device.

A simple and accurate change in the pressure force is achieved if the control or regulating device has a stepping motor acting on the toggle joint of the toggle lever system. A stepping motor of this type can act on the toggle lever system with great sensitivity and change the pressure force of the sonotrode on the material web.

BRIEF DESCRIPTION OF THE DRAWINGS

Further advantages, features and details of the invention may be gathered from the subclaims and from the following description, in which a particularly preferred exemplary embodiment is described in detail with reference to the drawing. At the same time, the features illustrated in the drawing and mentioned in the claims and in the description may in each case be essential to the invention, individually in themselves or in any combination. In the drawings:

DETAILED DESCRIPTION OF THE INVENTION

Figures 1, 2:
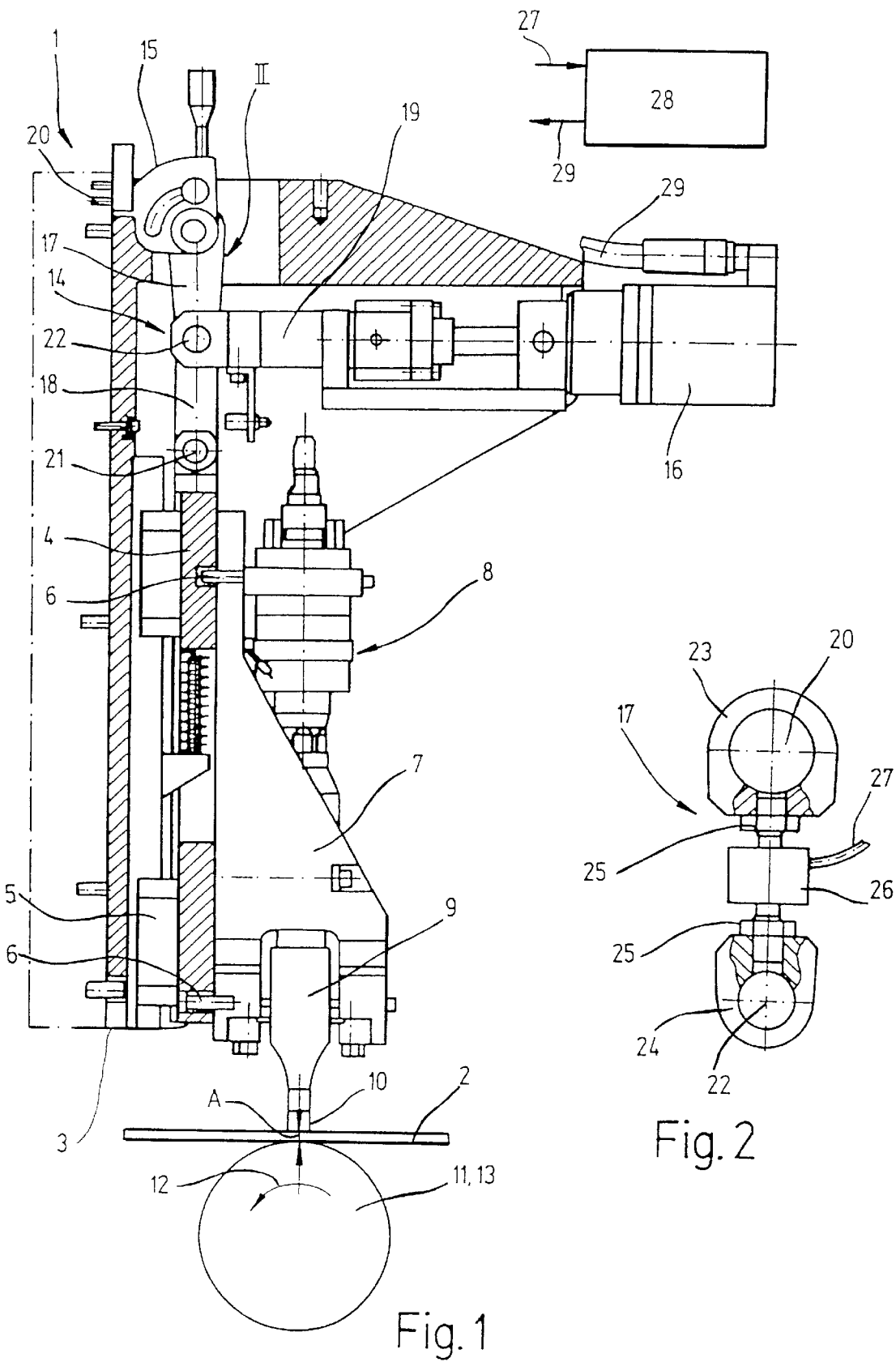
FIG. 1 shows a partially sectional side view of the apparatus according to the invention.
FIG. 2 shows an enlarged illustration of the component according to FIG. 1 designated by II.

FIG. 1 illustrates an apparatus, designated as a whole by 1, for the ultrasonic welding of a material web 2. This apparatus 1 has a column 3 which is fixed in place. A slide 4 is fastened to this column 3 in such a way that said slide can be displaced in the vertical direction. Suitable longitudinal guides 5 and bearings are provided for this purpose. A carrier 7, in which an ultrasonic unit 8 is arranged, is fastened to the slide 4 via a plug connection 6. This ultrasonic unit 8 has a sonotrode 9, the sonotrode tip 10 of which points in the direction of a counterstay tool 11, in FIG. 1 a roller 13 driven in the direction of the arrow 12. The material web 2 to be machined is located between the sonotrode tip 10 and the roller 13. The clearance between the free end face of the sonotrode tip 10 and the roller 13 is designated by A in FIG. 1.

Moreover, the slide 4 is connected to an actuating device 15 of the column 3 via a toggle lever system 14. By means of the actuating device 15, the position of the slide 4 in relation to the column 3, that is to say the vertical position of the slide 4, can be set in such a way that the clearance A between the sonotrode tip and the roller 13 assumes a specific value. However, this vertical position of the slide 4 may also be changed, in addition to the actuating device 15, by means a stepping motor 16 which acts on the toggle lever system 14.

The toggle lever system 14 has two toggle lever arms 17 and 18 and a toggle lever rod 19. The toggle lever arm 17 is connected to the actuating device 15 via a pivot bearing 20 and the toggle lever arm 18 is connected to the slide 4 via a pivot bearing 21. Moreover, the two toggle lever arms 17 and 18 and the toggle lever rod 19 are connected to one another via a toggle joint 22. Via the stepping motor 16, the toggle lever rod 19 can be displaced in the direction of the toggle joint 22, that is to say essentially orthogonally to the longitudinal axis of the two toggle lever arms 17 and 18, and away from the toggle joint 22.

The toggle lever system 14 can therefore be changed by actuation of the stepping motor 16, with the result that the clearance between the two pivot bearings 20 and 21 can be changed and the slide 4 can thereby be displaced in relation to the column 3 and the clearance A can thereby be changed.

The toggle lever arm 17 is illustrated, enlarged, in FIG. 2. The pivot bearing 20 and the toggle joint 22 are located in bearing lugs 23 and 24, into which nipples 25 are screwed. The two nipples 25 are, in turn, connected to one another via a force sensor 26. This force sensor 26 may be formed by a wire strain gauge, a piezoelectric element, a load cell or a similar element. At the same time, the force may be measured directly or indirectly. The force acting in the longitudinal direction of the toggle lever arm 17 can be determined directly by means of this force sensor. This measurement value is supplied via a line 27 to a control or regulating device 28 which, in turn, outputs a signal for the stepping motor 16 via a line 29.

If the clearance A has a correct value, the sonotrode tip 10 rests on the material web 2 with a specific force. The force sensor 26 determines a specific pressure force in the toggle lever system 14 or in the toggle lever arm 17 and transmits a measurement value as a desired value to the control or regulating device 28. When the clearance A changes, the force in the toggle lever arm 17 and therefore the measurement value of the force sensor 26 change. The control or regulating device 28 activates the stepping motor 16 on the basis of this change in the measurement value, with the result that the toggle lever rod 19 is displaced in such a way that the slide 4 is displaced via the toggle lever system 14 in such a way that this change in force at the sonotrode tip 10 is counteracted. As soon as the force sensor 26 measures a force corresponding to the reference value, the stepping motor 16 is also stopped in its instantaneous position.

The clearance a or the nip height at the sonotrode tip 10 can thereby be set to the optimum value, so that a uniform pressure force acts on the material web 2 permanently.

What is claimed is:

1. Apparatus for machining a material web (2), with an ultrasonic unit (8) having a sonotrode (9) and with a counterstay tool (11), the material web (2) being led through a nip between the sonotrode (9) and the counterstay tool (11) and being machined by the sonotrode (9), the sonotrode (9) being clamped in a slide (4) and the slide (4) being adjustable in relation to the counterstay tool (11) via an adjusting device, said adjusting device comprising a toggle lever system including first and second toggle lever arms respectively having first end portions pivotally attached to each other at a toggle-joint first pivot with a second end portion of said first toggle lever arm being pivotally attached at a second pivot to a member that is substantially stationary to said counterstay tool and a second end portion of said second toggle lever arm being pivotally attached to said slide at a third pivot with a sensor (26) connected to a control or regulating device(28) which controls pivoting of said first and second rigid pivoting arm relative to each other about said toggle joint to thereby move said slide relative to said counterstay tool and control a clearance (A) between the sonotrode (9) and the counterstay tool (11), as a function of a signal from the sensor (26), wherein the sensor is a compression force sensor (26) arranged on one of said first and second toggle lever arms for measuring the compression force acting along said one of said first and second toggle lever arms for thereby measuring a force acting on the sonotrode (9) in the direction of the counterstay tool (11).

2. Apparatus according to claim 1, wherein the sensor (26) is arranged on the first toggle lever arm (17).

3. Apparatus according to claim 1, wherein the sensor is a wire strain gauge.

4. Apparatus according to claim 1, wherein the regulating device (28) includes a stepping motor (16) for acting on the toggle-joint first pivot (22) of the toggle lever system (14) to thereby cause said first and second toggle lever arms to pivot relative to each other about said toggle joint.

5. Apparatus according to claim 1, wherein the sensor is a piezoelectric element.

6. Apparatus according to claim 1, wherein the sensor is a load cell.

* * * * *

UNITED STATES PATENT AND TRADEMARK OFFICE
Certificate

Patent No. 6,190,296                                                                     Patented: February 20, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerhard Gnad, Keltern, DE; Stefan Rau, Karlsbad, DE; Ulrich Vogler, Karlsruhe, DE; and Klaus Kubik, Toenisvorst, DE.

Signed and Sealed this Twenty-fifth Day of March 2003.

RINALDI RADA  
                                                                          *Supervisory Patent Examiner*  
                                                                                   Art Unit 3721